United States Patent [19]

Nappier et al.

[11] Patent Number: 5,099,780
[45] Date of Patent: Mar. 31, 1992

[54] BEARING SUPPORT FOR HOT DIP METAL COATING ROLL

[75] Inventors: Robert W. Nappier, Bethalto; Marvin C. Pansa, East Alton, both of Ill.

[73] Assignee: National Steel Corporation, Pittsburgh, Pa.

[21] Appl. No.: 578,423

[22] Filed: Sep. 6, 1990

[51] Int. Cl.⁵ ..................... B05C 3/152; B05C 11/00; B05C 11/06
[52] U.S. Cl. .................. 118/33; 118/DIG. 15; 118/63; 118/419; 118/420; 118/423; 384/129
[58] Field of Search ............... 118/419, 420, 423, 424, 118/DIG. 15, 33, 63; 384/129; 72/47; 427/436

[56] References Cited

U.S. PATENT DOCUMENTS

| | | | |
|---|---|---|---|
| 2,577,904 | 12/1951 | McNabb et al. | 118/DIG. 15 |
| 3,499,418 | 3/1970 | Mayhew | 118/665 |
| 3,595,207 | 7/1971 | Stricker | 118/420 |
| 4,410,285 | 10/1983 | Strasser et al. | 384/278 |
| 4,478,892 | 10/1984 | Amberson | 118/419 |
| 4,519,337 | 5/1985 | Ono et al. | 118/419 |
| 4,756,630 | 7/1988 | Teeslink | 384/30 |
| 4,773,771 | 9/1988 | Kramer | 384/98 |
| 4,807,559 | 2/1989 | Sommer et al. | 118/419 |

Primary Examiner—Richard V. Fisher
Assistant Examiner—Todd J. Burns
Attorney, Agent, or Firm—Kerkam, Stowell, Kondracki & Clarke

[57] ABSTRACT

A hot dip metal strip coating apparatus includes at least one roll submerged in a bath of molten coating metal for guiding the strip through the bath. The submerged rolls are mounted on the ends of support arms by bearings including a pair of substantially flat metal surfaces disposed in planes parallel to and spaced from the horizontal axis of the roll shaft, with the planes of the flat surfaces intersecting one another at an angle within the range of about 60° to about 135°. The flat bearing surfaces are oriented to contact the roll shaft tangentially, with the load in the strip and the flat bearing surfaces supporting the roll during coating and the bearing permitting the free flow of liquid metal between the bearing and shaft on each side of the tangential line of contact of each flat surface with the shaft.

10 Claims, 3 Drawing Sheets

BEARING SUPPORT FOR HOT DIP METAL COATING ROLL

BACKGROUND OF THE INVENTION

1. Field of the Invention

This invention relates to molten metal coating of metal sheet in continuous strip form and more particularly to an improved bearing support system for the rolls in a molten metal bath of a hot dip continuous metal strip coating apparatus.

2. Description of the Prior Art

Although there have been numerous improvements in hot dip metal coating in recent years, these improvements generally have been in the area of control and the alloys used as the coating metal. Since hot dip zinc and zinc alloy coating (herein generally referred to as galvanizing) is the most common form of molten metal coating operation, the invention will be described with reference to a galvanizing operation, it being understood that the invention may also be employed in other molten metal coating applications.

A typical continuous hot dip galvanizing apparatus used in zinc and zinc alloy coating of continuous steel strip is schematically shown, for example, in U.S. Pat. No. 3,499,418 which illustrates a steel strip being prepared for hot dip coating in a cleaning and annealing furnace, from which the strip passes, in a controlled atmosphere, directly into a molten zinc or zinc alloy bath. The metal strip extends downwardly into the molten metal and around a first submerged roll, referred to as a sink roll, then upwardly in contact with one or more stabilizing rolls which are also submerged in the molten metal bath. From the bath, the strip passes between a pair of opposed air knives which control the thickness of the metal coating, then upwardly through a cooling chamber to a top guide roll.

In galvanizing apparatus of the type described, the sink roll and stabilizing rolls normally are supported on arms projecting along the sides of the zinc pot into the molten metal bath. The rolls are supported by bearing assemblies each including a temperature resistant sleeve mounted on the projecting end of the roll shaft and an oversized bearing element or bushing mounted on the end of the roll support arm. Molten metal flowing into and through the oversized bushings acts as the only lubricant between the sleeve and bushing.

The temperature of the molten zinc or zinc alloy coating bath, which may be in the range of 950° F., in combination with the high tensile loads required to be maintained in the strip to control its high speed movement through the apparatus, results in the roll bearing assemblies wearing quickly. With increased bearing wear, the molten zinc becomes less effective as a lubricant, thereby increasing friction which in turn accelerates wear on the bushing and sleeve.

The combination of an oversized bushing and friction load can result in roll movement, or bearing chatter, which is aggravated by bearing wear. This chatter or movement of the sink roll, and to a lesser degree of the guide rolls, can produce strip movement at the air knives and set up vibrations in the strip between the guide rolls and the top roll. Excessive movement of the strip adversely effects uniformity of coating thickness, and high frequency vibration can result in spatter of the molten coating metal and produce undesired irregularities or markings on the finished coating surface. These irregularities may adversely effect further finishing operations such as painting.

To assure against unacceptable or undesired thin spots resulting from strip movement, it has been common practice to apply an increased coating thickness as a safety margin, thereby requiring an excess of expensive coating metal. It is, accordingly, a primary object of the present invention to provide an improved hot dip coating apparatus which enables the application of a more uniform coating in a hot dip metal coating line.

Another object of the invention is to provide an improved roll bearing support system for use in a hot dip galvanizing line to provide a more stable roll position and avoid excessive wear of the bearing.

Another object of the invention is to provide such a roll support bearing system which more effectively and efficiently utilizes the molten coating metal as a lubricant to reduce wear in the bearing elements and enable a more uniform tensile load to be applied to the strip being coated.

SUMMARY OF THE INVENTION

In the attainment of the foregoing and other objects and advantages of the invention, an important feature resides in providing a submerged bushing for receiving and supporting a bearing sleeve on a submerged roll shaft in a hot dip galvanizing operation. The bushing provides adequate clearance to permit the flow of molten metal between the shaft sleeve and bushing inner surface. A pair of flat bearing surfaces are provided on the bushing, with the flat surfaces being disposed at an angle to intersect one another and lying in planes parallel to the axis of the roll and tangent to the bearing sleeve during the galvanizing operation. Preferably the two flat surfaces on the bushing are disposed so that a plane bisecting the angle between them extends along the line of action of the force exerted by the strip on the roll. Molten metal flows along the bushing and sleeve at the apex of the angle defined by the bearing surfaces. The flat bearing surfaces, and the orientation of the surfaces relative to the line of force exerted by the strip on the roll, eliminates or minimizes the tendency of the roll to walk in the bushing and thereby avoids inducement of undesired chattering motion in the strip moving over the roll. During operation, the only contact between the bearing sleeve and bushing is at the flat bearing surfaces.

BRIEF DESCRIPTION OF THE DRAWINGS

Other features and advantages of the invention will be apparent from the detailed description contained here inbelow, taken in conjunction with the drawings, in which.

DESCRIPTION OF THE PREFERRED EMBODIMENT

Figure 1:
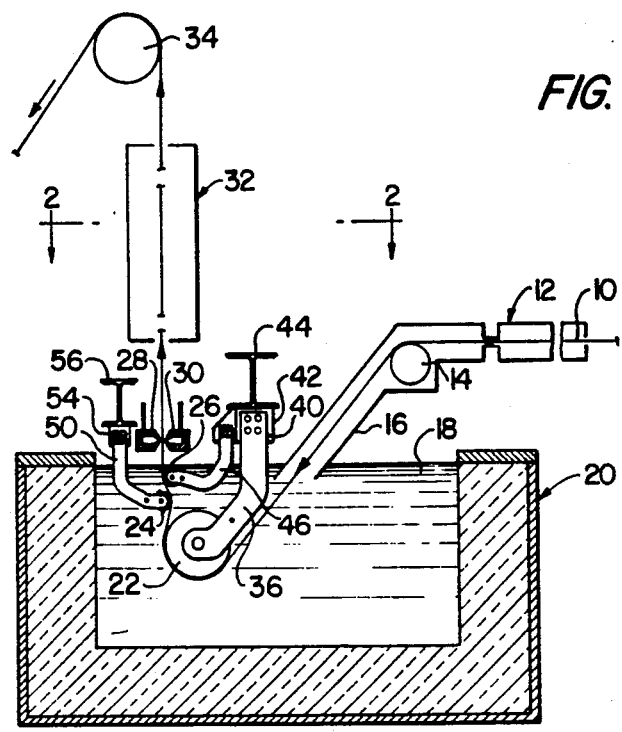
FIG. 1 is a schematic view of a hot dip galvanizing apparatus with which the invention is intended to be used.

Referring now to the drawings in detail, steel strip is indicated generally at 10 and is prepared for hot dip coating in an annealing oven 12 before passing over a guide roll 14 and downwardly through a chute 16 in a controlled, inert atmosphere into a bath of molten coating metal 18 in an insulated pot 20. The strip 10 is guided around a large diameter sink roll 22 in pot 20, then upwardly in contact with a front or lower stabilizing roll 22 and a rear or upper stabilizing roll 24 before emerging from the molten metal bath and passing between a pair of opposed air nozzles or air knives 28, 30 which control the thickness of the layer of molten metal adhering to the surfaces of the strip 10. From the air knives, the coated strip passes upwardly through a cooling chamber 32 for a distance to permit the coating metal to solidify before passing over a top guide roll 34.

Figure 2:
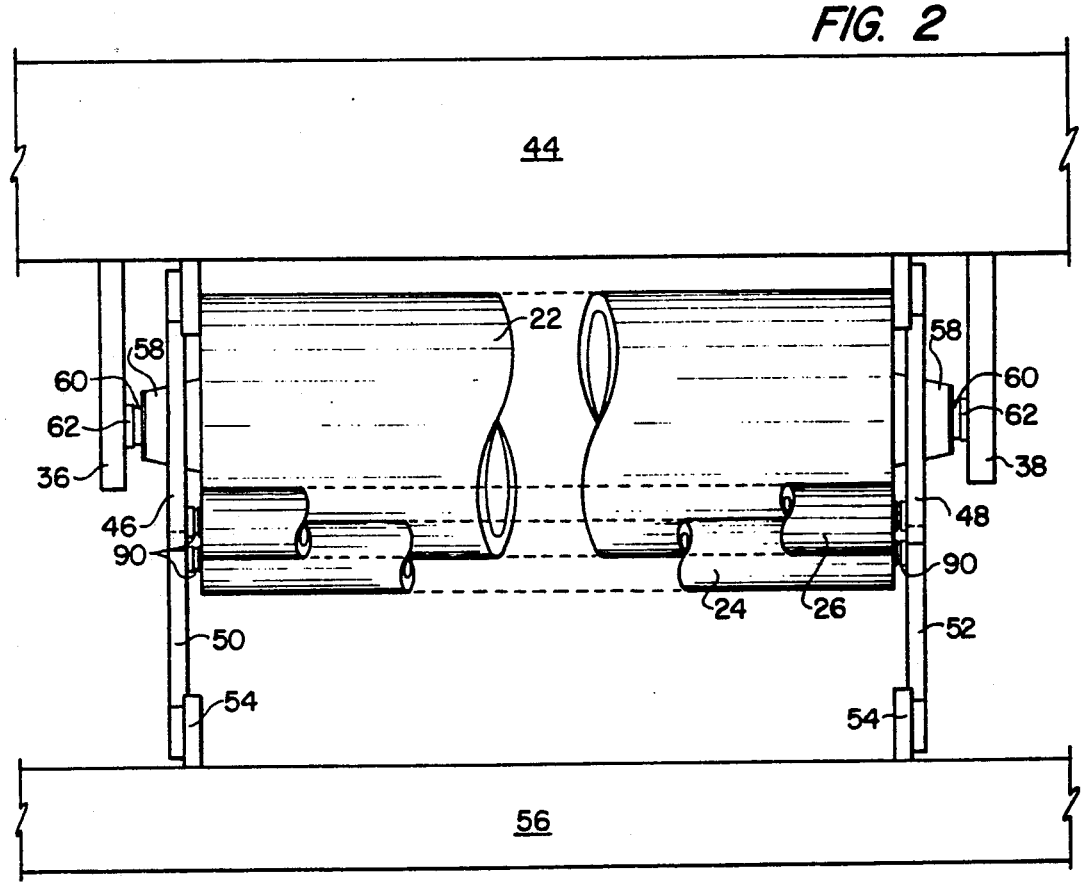
FIG. 2 is a top plan view of a portion of the structure shown in FIG. 1.
Figure 3:
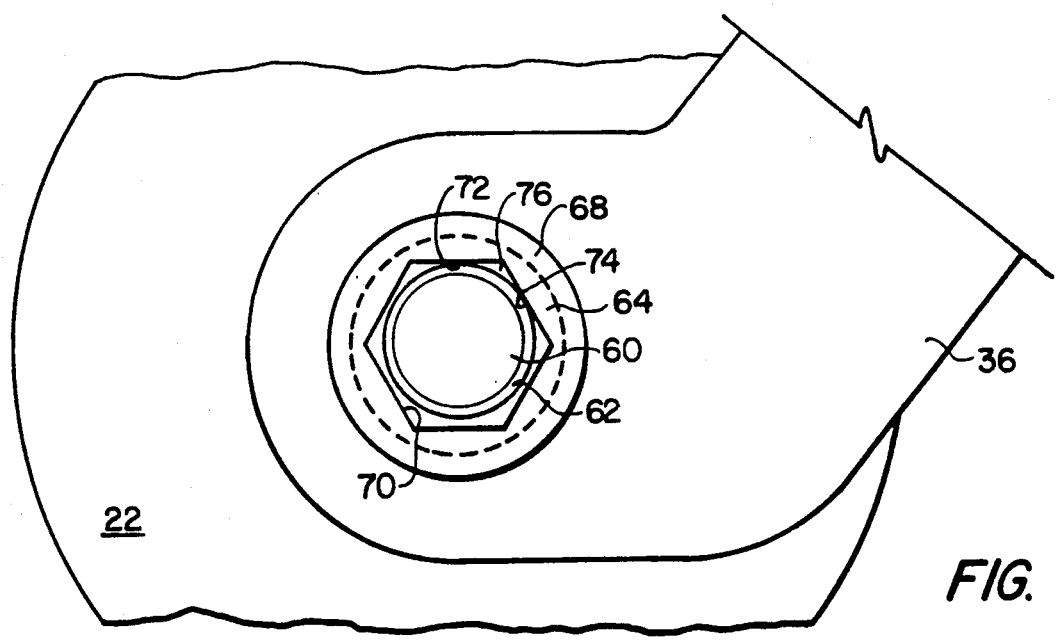
FIG. 3 is a enlarged fragmentary elevation view of a portion of the sink roll support structure shown in FIG. 1.

As most clearly seen in FIGS. 1 and 2, sink roll 22 is supported for rotation about a horizontal axis within the coating pot 20 by a pair of support arms 36, 38 projecting into the molten metal bath 18 one adjacent each opposed side wall of the pot 20. Arms 36, 38 are substantially identical and have their top end supported, as by bolts 40, to a rigid bracket 42 mounted, as by welding, on a transverse bridge structure 44 spaced above the top of the pot 20. Similarly, rear stabilizing roll 26 is supported by a pair of arms 46, 48 mounted on bridge 44, and front stabilizing roll 24 is supported by a pair of arms 50, 52 mounted on brackets 54 on a second bridge 56.

Referring now to FIGS. 2-5, it is seen that the sink roll 22 has an axially extending, frustoconical hub 58 projecting outwardly from each end thereof, with a stub shaft 60 extending outwardly from each hub. A conventional temperature and wear resistant cylindrical sleeve 62 is mounted, as by welding, on the end portion of each stub shaft 60, with the stub shaft and sleeve being received within the axially extending opening of a bushing element 64 mounted on and extending through each of the support arms 36, 38 adjacent the distal ends thereof. Bushing members 64 are fixed against rotation, as by welding, relative to their supporting arms, and preferably a spacing bar, not shown, extends between arms 36, 38 to retain the arms in fixed spaced relation.

The relatively small diameter stabilizing rolls 24, 26 deflect the strip in a manner to provide a straightening or levelling effect and guide the strip as nearly as possible in the desired position relative to the opposed air knives 28, 30. In order for the air knives to effectively control the coating thickness, it is necessary for the outlet of these nozzles to be positioned closely adjacent the moving strip surface so that the very thin, wide gas jet (usually air or steam) will provide an effective, substantially uniform pressure dam across the full width of the strip. This uniform action of the air knives is only possible, however, so long as the spacing between the air knives and the opposed strip surface remains uniform. Also, since air knives 28, 30 are directly opposed to one another, any movement of the strip produces opposite effects on the two sides of the coated strip. Thus, for example, movement of the strip in a direction away from nozzle 28 will result in a reduction in the pressure of the air dam and a consequent increase in coating thickness and at the same time result in an increase in pressure from nozzle 30 with a consequent reduction in coating thickness on that side of the strip.

Since the coating metal on the strip surface remains liquid for a substantial distance above the air nozzles 28, 30, the strip is necessarily unsupported between rear stabilizing roll 26 and the top guide roll 34 The length of the strip between these two rolls, combined with the heavy tensile load and high speed of the strip, can result in any movement at either end of the strip being amplified and setting up lateral vibrations in the unsupported strip. In the past, it has been found that such movement can be so severe as to cause spatter of the molten metal at the surface of the bath which can result in droplets of molten metal striking the air knives and interfering with the uniform flow of air from the nozzle and produce a streak-like defect in the coating. Also, movement of the strip toward and away from the nozzles can produce a visible transverse stripe-like defect on the coating as a result of coating thickness variations.

Figure 4:
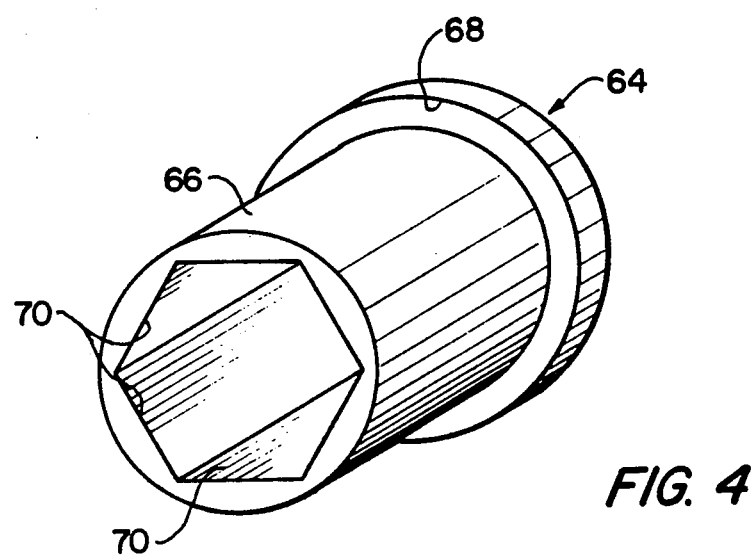
FIG. 4 is a view similar to FIG. 3 and showing a portion of the stabilizing roll support structure shown in FIG. 1.
Figure 5:
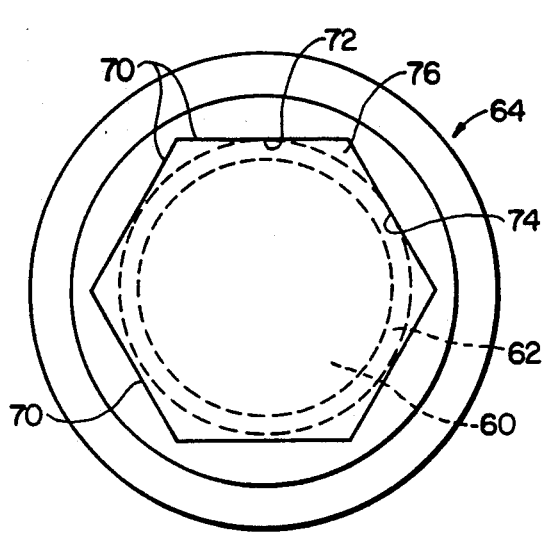
FIG. 5 is an isometric view of a roll support bearing element according to the present invention.

As best seen in FIGS. 4 and 5, bushing 64 has a cylindrical outer surface 66 dimensioned to fit within a complementary opening, not shown, in the supporting arm, with an outwardly extending flange 68 integrally formed at one end of the bushing.

Bushing 64 is provided with an oversized axial opening for receiving the sleeve 62 and shaft 60. The bushing opening is provided with a plurality of flat surfaces disposed in planes parallel to the bushing axis and arranged at angles to one another so that, when roll 22 is mounted in the bushing 64 with sleeve 62 in contact with two adjacent flat surfaces along parallel tangent lines, the sleeve will be spaced from the bushing inner surface around the remaining periphery of the sleeve 62. In the embodiment shown in FIGS. 3-5, the central opening in bushing 64 is in the form of a regular hexagon, presenting six identical flat bearing surfaces 70 on the interior of the bushing. The stub shaft 60 and sleeve 62 are shown in broken lines in FIG. 5, with the outer cylindrical surface of sleeve 62 in contact with two of the surfaces 70 at tangent lines 72 and 74. This is the position the sleeve and bushing will take during operation of the galvanizing line. In this position, it is noted that the sleeve 70 is spaced from the remaining four flat surfaces 70 and that an axially extending space 76 is provided between the sleeve 62 and the apex of the two flat surfaces 70 contacting the sleeve. This space 76 permits the flow of liquid metal between the bushing and sleeve to assure a fresh and continuous supply of lubricating liquid metal to be drawn between the sleeve and surface 70 at the tangent line 74. Similarly, liquid metal in the space between the sleeve and the remaining flat surfaces of the bushing will maintain a continuous supply of liquid metal to be drawn into and lubricate the sleeve and bushing at tangent line 72. The high tensile load in the strip being processed, acting through the roll 22 and stub shaft 60, will maintain the sleeve surface in firm continuous contact with the bushing along tangent lines 72,74, and the circumferential spacing of lines 72, 74 will assure against the sleeve tending to walk, or move in translation, within the bushing.

By forming the central opening in bushing 64 in the form of a regular hexagon, when wear of the sleeve and bearing surfaces along lines 72, 74 causes excessive contact between the sleeve and bearing surfaces, the roll assembly can be removed from the pot and bushing 64 removed and rotated through 120°. The bushing is then again rigidly joined, as by welding, in the new position to provide two new flat bearing surfaces in contact with the sleeve along tangential lines in the manner described above. Thus, the hexagonal arrangement permits the bushing to be installed in three different positions thereby substantially increasing the life of the bushing and reducing costs.

Figure 6:
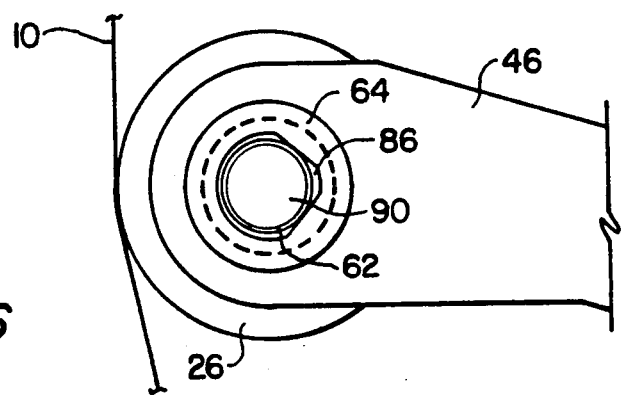
FIG. 6 is an enlarged end view of the bearing element shown in FIG. 5 and having a sink roll supported therein.
Figure 7:
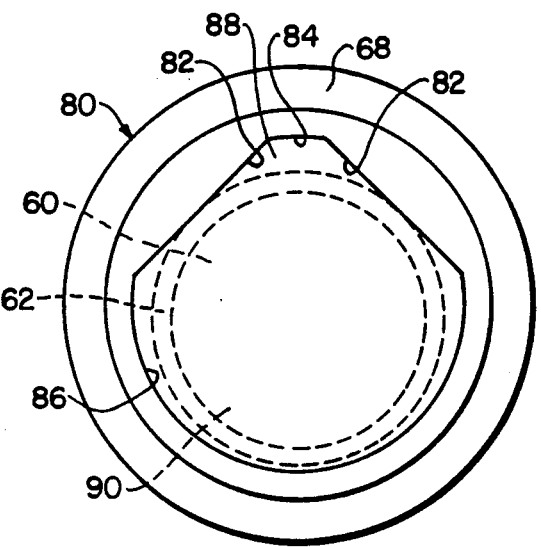
FIG. 7 is a view similar to FIG. 6 and showing a alternate embodiment of the bearing element.

An alternate embodiment of the invention is shown in FIGS. 6 and 7. In this embodiment, a bushing 80 is provided with only two planar bearing surfaces 82 joined at their converging edges by an arcuate surface 84 providing an open space 88 between the sleeve 62 and bushing and at their diverging edges by a longer arcuate surface 86 again providing open space between the sleeve and bushing. The radius of arcuate surface 86 is sufficiently large such that the outer cylindrical surface of sleeve 62 does not contact the surface 86 during operation as described above. Except for the configuration of the inner surface, bushings 64 and 80 are identical. In this second embodiment, when surfaces 82 become worn, the bushings are simply removed and replaced.

In FIG. 6, bushing 80 is illustrated as being mounted in an opening in front stabilizing arm 46 with a bearing sleeve 62 mounted on the rigid stub shaft 90 of stabilizing roll 26. It is understood, however, that either bushing configuration may be employed to mount either the sink roll or the stabilizing rolls. It is also noted that stabilizing rolls 24 and 26 are identical but are mounted on opposite sides of the strip so that orientation of the bushing in the support arms is different as explained below.

Figure 8:
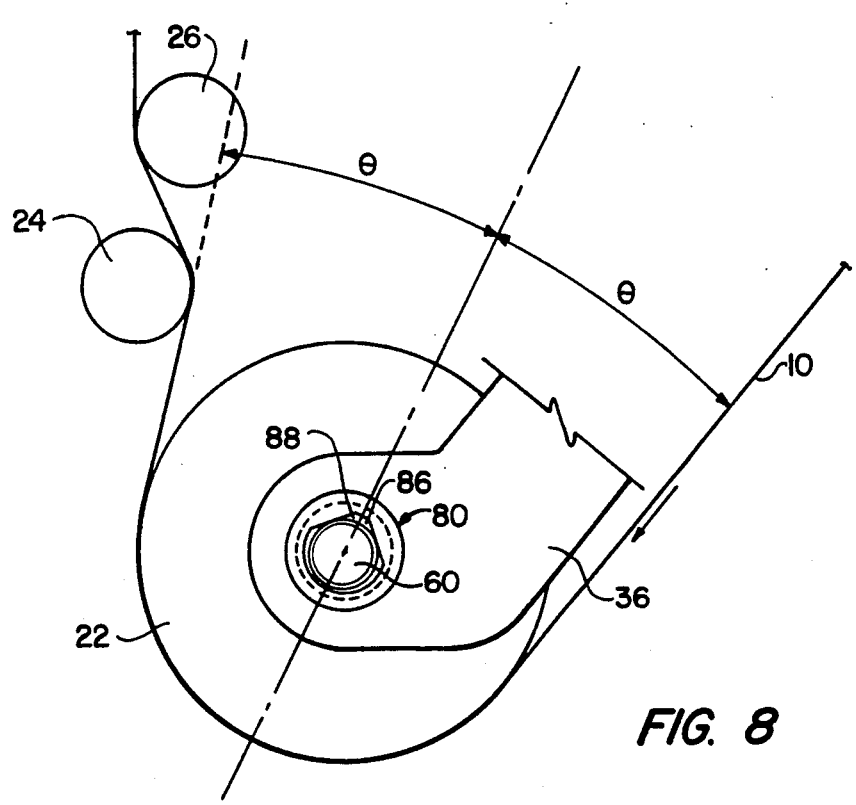
FIG. 8 is a diagramatic showing of the positioning of the roll support bearing element of FIG. 7 in the apparatus relative to the line of force on the bearing element resulting form the product being galvanized.

Referring to FIG. 8, the preferred orientation of the bushing illustrated in FIGS. 6-7 is used to support the sink roll 22. As previously stated, operation of a metal strip hot dip galvanizing line requires a relatively heavy tensile load in the strip 10, and, since roll 22 is free to rotate about its horizontal axis, the load in the strip on each side of the roll will be substantially equal. This load in strip 10 produces a resultant force on the roll acting along a line substantially bisecting the angle between the length of strip at each side of the roll 22. In order to produce substantially equal bearing loads between the sleeve 62 and the planar bearing surfaces 82, the bushing 80 is oriented so that the resultant force on the roll acts along a line passing through the horizontal axis of the roll and bisecting the included angle between the bearing surfaces 82.

When the embodiment of the bushing 64 shown in FIGS. 2-5 is employed to mount sink sub roll 22, the bushing is oriented in a similar manner, i.e., the line of force on the roll substantially bisects the included angle between the two bearing surfaces 70 in contact with the sleeve 62 during operation. Similarly, the bushings employed to support the stabilizing rolls 24, 26 are preferably oriented so that the force applied to the respective rolls by the strip acts along a line passing through the axis of that stabilizing roll and bisecting the angle between the bearing surfaces on the bushing in contact with the roll sleeve.

In operation of a hot dip strip galvanizing line, it has been found that the invention described results in a substantially more stable strip emerging from the coating pot. This has enabled the air knives to maintain the coating thickness within closer tolerances with the result that the total coating weight can be reduced and a substantial savings in coating metal realized. At the same time, the improved lubrication of the bearing surfaces resulting from the substantially tangential contact between the plane bearing surfaces of the bushings and the cylindrical bearing sleeves fixed on the roll shafts has substantially increased bearing life, with a consequent savings in down time.

The sink roll and the stabilizing rolls are supported during the coating operation by the strip contacting the outer cylindrical surface of the respective roll body and by the flat bearing surfaces. This provides, in effect, a three point loading for each roll which substantially eliminates the tendency of the roll shaft to walk and chatter in the bearing. In turn, the stable roll operation results in a more stable strip emerging from the molten metal in the bath and passing through the coating thickness control. It has been found that the included angle between the two flat bearing surfaces supports the roll during operation should be between about 60° and 135° and preferably within the range of about 90° to about 120°. Smaller angles may result in increased bearing loads while substantially larger angles can reduce roll stability.

It is believed apparent that various modifications to the invention could be made. For example, while a regular hexagonal opening is illustrated in one embodiment, it is believed apparent that a triangular, square, pentagonal or other bushing opening configuration might be used. It is important that the roll work load applied by the tensile load in the strip being coated is carried by the generally tangential contact between the roll shaft and the flat metal bearing surfaces, and that the bushing configuration provides for the flow of molten coating metal between the shaft and the bearing surfaces ahead of the tangential contact line of each flat bearing surface. Also, it is noted that the bearing sleeves are fixed on the roll shafts for rotation therewith and could be eliminated; however, such sleeves may be considered as an integral part of the roll shaft and their use extends the useful life of the rolls.

While preferred embodiments of the invention have been disclosed and described, it is believed apparent that the invention is not limited to these embodiments, and it is intended to include all embodiments which would be apparent to one skilled in the art and which come within the spirit and scope of the invention.

What is claimed is:

1. In a continuous hot dip metal coating apparatus for coating metal strip with molten metal, the apparatus including an insulated vessel for containing a bath of molten coating metal and roll means including at least one roll submerged in the bath defining a path of travel for a running length of the metal strip through a portion of the molten metal bath with the strip engaging and applying a load to each submerged roll as a result of a tensile load in the strip during coating, each submerged roll including a cylindrical body and a rigid shaft projecting axially from each end of the body, a pair of laterally spaced roll support arms each having a fixed end mounted above the insulated vessel and a free end projecting into the molten metal bath for supporting each submerged roll, and bearing means mounting the shaft at each end of each submerged roll on the free end of one support arm, the improvement wherein said bearing means comprises a pair of substantially flat metal bearing surfaces disposed in planes parallel to and spaced from the horizontal axis of the shaft, said planes intersecting one another so that the included angle between said pair of flat surfaces is within the range of about 60° to about 135°, said pair of flat bearing surfaces tangentially contacting said shaft at circumferentially spaced locations and cooperating to provide a reaction force in opposition to the load applied to the roll by the strip, said pair of flat bearing surfaces and said strip providing the sole radial support for the submerged roll during operation of the apparatus to coat metal strip, and fixed shaft retaining means spaced from said flat bearing surfaces and cooperating therewith to engage and retain said shaft on said roll support arms when no load is applied to the roll by the strip, said fixed shaft retaining means and said flat bearing surfaces being configured to permit the flow of molten metal around said shaft on each side of the line of contact between each said flat bearing surface and said shaft.

2. The apparatus defined in claim 1 wherein said bearing means comprises a bushing mounted in fixed position on the end portion of each said support arm, said bushing having an opening extending therethrough in the form of a regular polygon for receiving and supporting said shaft, and wherein two adjacent sides of said polygon define said pair of flat bearing surfaces.

3. The apparatus defined in claim 2 wherein said regular polygon is a hexagon and wherein the distance between opposing sides of the hexagon is greater than the diameter of the shaft.

4. The apparatus according to claim 3 wherein said bushing is adapted to be removed from said support arm, then rotated through 120° and remounted in fixed position in the support arm to present two new flat bearing surfaces in contact with said shaft during use of the apparatus to coat metal strip.

5. The apparatus as defined in claims 1, 2 or 3 wherein said flat bearing surfaces are oriented on said support arm so the line of intersection of the planes of said flat bearing surfaces and the line of action of the force applied to the submerged roll by said strip lie in a common plane.

6. The apparatus as defined in claim 1 wherein the included angle between said two flat surfaces is within the range of about 90° to about 120°.

7. The apparatus defined in claim 6 wherein said flat bearing surfaces are oriented on said support arm so that the line of intersection of the planes of said flat bearing surfaces and the line of action of the force applied to the submerged roll by said strip lie in a common plane.

8. The apparatus defined in claim 1 wherein said bearing means comprises a bushing having an opening therethrough for receiving said shaft, said opening having flat wall portions defining said pair of flat bearing surfaces and further wall portions defining said fixed shaft retaining means, and wherein said fixed shaft retaining means is out of contact with said shaft during operation of the apparatus to coat metal strip.

9. The apparatus defined in 8 wherein said fixed shaft retaining means is in the form of a generally arcuate surface extending between and joining said flat bearing surfaces.

10. The apparatus as defined in claim 8 wherein the included angle between said two flat surfaces is within the range of about 90° to about 120°.

* * * * *